United States Patent [19]

Endo et al.

[11] Patent Number: 5,061,521
[45] Date of Patent: Oct. 29, 1991

[54] PROCESS FOR PRODUCING MODIFIED MOLDED POLYMER ARTICLES

[75] Inventors: Zen-ichiro Endo; Shigeyoshi Hara; Umewaka Nakatani, all of Iwakuni, Japan

[73] Assignee: Hercules Incorporated, Wilmington, Del.

[21] Appl. No.: 451,892

[22] Filed: Dec. 18, 1989

[30] Foreign Application Priority Data

Dec. 20, 1988 [JP] Japan ................... 63-319460

[51] Int. Cl.$^5$ ............... B29C 45/00; B29C 71/00
[52] U.S. Cl. .................... 427/307; 264/232; 264/340; 264/343; 427/400
[58] Field of Search ........... 264/83, 232, 328.6, 264/331.13, 340, 343; 525/331.9, 332.1, 332.3, 333.1, 356, 359.1, 359.5, 359.6; 528/490, 491, 497, 498, 502; 427/307, 400

[56] References Cited

U.S. PATENT DOCUMENTS

| | | |
|---|---|---|
| 2,631,984 | 3/1953 | Crawford et al. . |
| 3,220,993 | 11/1965 | Blatz . |
| 3,758,450 | 9/1973 | Margrave et al. . |
| 3,968,198 | 7/1976 | Honda et al. ................... 264/343 |
| 3,992,221 | 11/1977 | Homsy et al. . |
| 4,228,254 | 10/1980 | Powers et al. . |
| 4,300,970 | 11/1981 | Honda et al. ............. 264/328.1 X |
| 4,400,340 | 8/1983 | Klosiewicz ................. 264/328.6 |
| 4,621,107 | 11/1986 | Lagow et al. . |
| 4,918,146 | 4/1990 | Matlack . |

FOREIGN PATENT DOCUMENTS

57-80039  5/1982  Japan ................... 264/343

OTHER PUBLICATIONS

English-Language Translation of Japanese Reference (Kokai) 57-80,039 (publlished 5/82).

*Primary Examiner*—Leo B. Tentoni
*Attorney, Agent, or Firm*—Roy V. Jackson; William S. Alexander

[57] ABSTRACT

A method for improving the properties of a metathesis polymerized cycloolefin article by treating with molecular halogen in an organic solvent. Degree of treatment can be regulated according to the swelling power of the solvent for the polymer. Improved properties include improved flame retardance, oxidation resistance and surface properties.

9 Claims, 2 Drawing Sheets

PROCESS FOR PRODUCING MODIFIED MOLDED POLYMER ARTICLES

The present invention relates to a molded polymer article prepared by the simultaneous polymerization and molding of a metathesis polymerizable cycloolefin monomer in the presence of a metathesis polymerization catalyst.

More particularly, the invention relates to a process for producing a modified molded polymer article having improved flame retardance and improved surface properties by contacting said molded polymer article with molecular hydrogen, thereby bonding the halogen to the polymer mainly by the addition reaction of the halogen to unsaturated carbon-carbon bonds in the recurring unit of the polymer.

It is known that ring-opened polymers are produced from cycloolefins by the use of a metathesis polymerization catalyst system. A process has been proposed to obtain a molded polymer article by carrying out the polymerization and molding of a metathesis polymerizable cycloolefin such as dicyclopentadiene (DCPD), in one step in a mold using a metathesis polymerization catalyst. More particularly, a process has been proposed to obtain a molded polymer article, taking advantage of the fact that a metathesis polymerization catalyst system is composed of two components consisting of a catalyst component such as, e.g., tungsten chloride and an activator component such as an alkylaluminum, by using two solutions each containing one of the catalyst system components and a monomer, quickly mixing the solutions and injecting the mixture into a mold (for example, cf. Japanese Patent Laid Open Sho 58-129013).

This process is very attractive from the industrial viewpoint because large-sized molded articles having excellent properties can be produced with inexpensive low-pressure molds. However, it has been found that various improvements on the process are desirable for some applications.

Impartment of flame retardance to the polymer is one problem to be solved. Since the polymer is principally composed of hydrocarbon repeating units containing unsaturated bonds, it is highly combustible once ignited. Therefore, a polymer having improved flame retardance is frequently required according to the intended use.

Improved flame retardance can be imparted to the polymer by introduction of halogen either into the polymer molecule or as an additive to the polymer composition. Examples of processes for achieving this purpose include using a halogen atom-containing metathesis polymerizable cycloolefin as at least a part of the monomer components, treatment with neat molecular liquid or gaseous halogen, and the addition of a conventional halogen-containing low-molecular weight compound containing a large amount of halogen such as decabromodiphenyl ether or a halogen-containing polymer containing a large amount of halogen such as a poly(bromostyrene). The first process is, in principle, a highly desirable technique for obtaining a flame-retardant polymer However, the method is commercially impractical since such a halogen-containing monomer is not available as a raw material in commercial production. The use of a low-molecular weight or polymeric halogen-containing flame retardant is easy to practice because a commercially available flame retardant meets the purpose. However, such flame retardants are usually sparingly soluble in the cycloolefins used as the monomer and, consequently, the reactive solution becomes non-uniform on standing due to precipitation of the flame retardant. Such precipitation creates handling difficulties during molding and is also detrimental to physical properties of the molded polymer. Treatment with a molecular liquid or gaseous halogen is a highly effective technique whereby substantially any desired amount of halogen can be added, making use of the reactivity to halogen addition of the carbon-carbon double bonds in the polymer molecule. However, when handling molecular liquid or gaseous halogen, specific apparatus is required because of the high toxicity and corrosivity of the halogen molecule. This technique, accordingly, may not be best for all situations.

According to the present invention, a process is provided for producing a modified molded polymer article which comprises contacting a molded polymer article produced by the simultaneous polymerization and molding (hereinafter "reaction molding") of at least one metathesis polymerizable cycloolefin in the presence of a metathesis polymerization catalyst with molecular halogen or a halogenation agent similar in reactivity to molecular halogen, said contacting being carried out in the presence of an organic solvent.

Any molded article produced by conventional processes for the production of molded polymer articles can be treated according to the process of the present invention. The halogenation treatment can be carried out by simply contacting the article with a halogen in a solvent at room temperature or thereabout. Since halogenation using this technique will take place on the surface of the article, surface properties, in addition to flame retardance, will be affected. Specifically, halogenation of the surface increases the resistance of the surface to oxidation and, in addition, decreases the gas permeability of the surface and thus decreases the amount of oxygen which can reach the interior of the polymer where it can cause oxidative degradation.

The halogen to be used in the present invention includes molecular bromine, chlorine, iodine and fluorine. Bromine and chlorine are especially preferable from the viewpoint of the improvement in flame retardance. The degree of surface treatment will, of course, depend upon the amount of halogen bonded to the polymer. Control of the degree of halogenation can be effected by selection of the solvent used for the reaction. Factors involved in controlling the degree of halogenation include the swelling ratio of the polymer in the solvent (i.e., the swelling power of the solvent) and the solubility of the halogen in the solvent. Solvents in which the polymer has a high swelling ratio increase the rate and degree of halogenation.

The solvent to be used in the process of this invention can be virtually any organic solvent that swells the polymer to at least some extent, is essentially inactive to side reactions with the polymer other than halogenation, is essentially inactive with halogen and dissolves the halogen to at least some extent. Preferred solvents are the halogenated hydrocarbons, most preferably the halogenated, saturated aliphatic hydrocarbons. Examples of halogenated hydrocarbons that can be used include methylene chloride, bromoform, chloroform, carbon tetrachloride, 1,1-dichloroethane, 1,2-dichloroethane, 1,1,2-trichloroethane, 1,1,1,2tetrachloroethane, trichloroethylene, perchloroethylene, butyl chloride, chlorobenzene, 1,2-dichlorobenzene, trichloromethyl toluene, hexachloroxylene and the bromo, fluoro, and iodo analogs of these. These halogenated hydrocarbons differ in dipole moment according to the position of the halogen atom and, accordingly, various solvents are available to meet the requirement for a wide variety of swelling ratios to the metathesis polymer and a solvent having a proper swelling ratio can be selected according to the required halogenation ratio. Caution is necessary in the use of a solvent having carbon-carbon double bonds because, under certain conditions, such solvents may undergo addition of halogen to its double bond or further the substitution of a hydrogen atom along with a halogen atom via a radiation mechanism leading to a lower halogenation efficiency than would be obtained with a saturated compound.

Examples of solvents other than the above halogenated hydrocarbons are aromatic hydrocarbons such as benzene, ethers such as tetrahydrofuran and diphenyl ether, esters such as ethyl acetate, and the like. Such solvents are not preferred because the methyl group of toluene or xylene and the methyl of the acetyl group of ethyl acetate, e.g., is activated by the adjacent double bond, the solvent itself is halogenated with generation of hydrogen halide to consume the halogen and reduce the halogenation efficiency of the process. Furthermore, care is necessary due to the possibility of the breakage of an ether or ester bond.

Some solvents having active hydrogen, for example alcohol, amines, aliphatic ketone such as acetone, carboxylic acid and the like can participate in the reaction, but halogenation takes place in the form to halogenate one end of a double bond and insert an actived hydrogen residue to the other end in place of the addition of halogen to both ends of the double bond. These solvents thus do not halogenate the polymer as efficiently as do the others mentioned above. Moreover, these solvents have relatively low swelling power for the polymer and thus do not permit penetration much beyond the surface of the polymer article.

One of the characteristic features of the posthalogenation process of the present invention is the flexibility to control the degree of halogenation in the direction of the thickness of the molded article. When using a solvent having little swelling power for the polymer, e.g., alcohols, ketones or amines, halogenation is restricted to the part closest to the surface. As the swelling power of the solvent increases, the halogenation penetrates deeper into the polymer body. When the whole of the article is to be halogenated, a solvent having a high swelling power is selected and the article is sufficiently swollen with the solvent before the addition of halogen. When a surface layer is to be highly halogenated to a desired thickness, halogen can be added at a high concentration to a solvent capable of exhibiting high swelling ratios and the halogenation is carried out simultaneous to the start of swelling and the reaction is terminated when the swelling proceeds to a proper thickness. Various reaction processes can be contrived by specialists to effect halogenation to the proper degree and to the desired depth. The degree of halogenation can be estimated with reasonable accuracy by measuring the weight increases. Other techniques such as elemental analysis or infrared can be used, but it is usually not necessary to measure any more accurately than can be done by measuring the weight increase.

The addition of a halogen which is liquid at normal temperature, for example bromine, can be carried out either in the form of liquid or it can be vaporized and the vaporized gaseous halogen can be bubbled into the solvent in the same manner as the introduction of chlorine which is gaseous at normal temperature. A solid halogen is simply dissolved in the solvent. The concentration of halogen in the reaction system can be controlled below the solubility limit of the halogen in said medium in order to minimize escape of halogen gas from the system. The reaction is carried out generally at room temperature or thereabout or under slight cooling. Although the swelling ratio of the molded polymer article in the solvent can be increased to increase the degree of halogenation, side reactions other than the addition reaction to the double bond are liable to take place and, accordingly, it is necessary to select the optimum conditions by experiment.

The reaction time depends upon the other reaction conditions and is generally about 1 to 50 hours.

The residual solvent should be evaporated from the molded article after the completion of the halogenation treatment, by taking the article out of the medium and drying it.

The halogen-treated molded article may contain residual free halogen or hydrogen halide. Such residual halogen can cause an adverse effect in the use of the article and, accordingly, it is preferably removed by thoroughly washing the molded article. As an alternative method, the residual halogen can be removed by chemical reaction using a reactive reagent such as ammonia.

Any molded polymer article produced by using at least one metathesis polymerizable cycloolefin as at least a part of the monomer component and carrying out the reaction molding of the monomer in the presence of a metathesis polymerization catalyst can be treated by the treatment of the present invention, because the article contains at least one carbon-carbon double bond in the repeating unit of the constituent polymer and the halogen can be added to the double bond by the modification treatment of the present invention.

Especially preferable article is a crosslinked molded polymer article produced by using a main monomer component consisting of metathesis polymerizable cycloolefins containing a cycloolefin having two or more metathesis polymerizable cycloolefin groups as at least a part of the main monomer component. Polymerization is effected by preparing two reactive solutions A and B, one containing a catalyst component and one containing an activator component together with the monomers, quickly mixing the solutions, for example by impingement mixing, and pouring the mixture into a mold to effect the reaction.

The metathesis polymerizable cycloolefin is preferably one having a high degree of ring strain because of its high polymerizability. Especially, a group having norbornene structure is preferable from the viewpoint of the ease of production and high polymerizability.

Preferable concrete examples of metathesis polymerizable cycloolefins include dicyclopentadiene, tricyclopentadiene, 1,4,5,8-dimethano-1,4,4a,5,8,8a-hexahydronaphthalene, 1,4,5,-8,9,10-trimethano-1,4,4a,5,8-,8a,9,9a,10,10a-decahydroanthracene, 1,2-addition compound of 1,5-cyclooctadiene, and cyclopentadiene, ethylenebisnorbornene, phenylenebisnorbornene, norbornene, norbornadiene, 5-methylnorbornene, 5-ethylidenenorbornene, 5-phenylnorbornene, vinylnorbornene, dihydrodicyclopentadiene, cyclopentadienemethylcyclopentadiene-codimer, 1,4,5,8-dimethano-1,4,4a,5,6,7,8,8a-octahydronaphthalene, 6-methyl- 1,4,5,8-dimethano-1,4,4a,5,6,7,8,8a-octahydronaphthalene, and 6-ethylidene-1,4,5,8-dimethano-1,4,4a,5,7,8,8a-heptahydronaphthalene.

In the present invention, other cycloolefins containing hetero atom, in other words cycloolefins having a polar group may be used as a part of the monomer in addition to the cycloolefins composed solely of hydrocarbons. The polar group is preferably an ester group, ether group, cyano group, N-substituted imido group or halogen.

Examples of the copolymerizing monomer include 5-methoxycarbonylnorbornene, 5-(2-ethylhexyloxy)-carbonyl-5methylnorbornene, 5-phenyloxymethylnorbornene, 5-cyanonorbornene, 6-cyano-1,4,5,8-dimethano-1,4,4a,5,6,7,8,8a-octahydronaphthalene, N-butyl-nadic acid imide, 5,6-dichloronorbornene and the like.

It is required that the metathesis polymerizable polycyclic cycloolefins be those containing the lowest possible amount of impurities which inactivate the metathesis polymerization catalyst.

The preferable monomer composition for the molded polymer article of the present invention is a combination of 100 to 50 mol % of dicyclopentadiene, the remaining part being at least one other metathesis polymerizable cycloolefin having the norbornene structure unit mentioned above.

As the catalyst component of the metathesis polymerization catalyst system used in the production of the molded polymer article of the present invention are used salts such as halides of tungsten, rhenium, tantalum, molybdenum and the like, especially tungsten and molybdenum compounds. Among preferred compounds are tungsten and molybdenum halides and oxyhalides. More particularly, tungsten hexachloride and tungsten oxychloride are preferred. Organo ammonium tungstate or molybdate may also be used. However, some of these tungsten or molybdenum salt compounds undesirably initiate cationic polymerization immediately when added directly to the monomer. A Lewis base or a chelating agent can be added to the catalyst in an amount of about 1 to 5 mol per 1 mol of the tungsten compound in order to prevent undesirable polymerization. Those additives may include acetylacetone, acetoacetic acid alkyl esters, tetrahydrofuran, benzonitrile and the like. Under such situations, the monomer solution (Solution A) containing the catalyst component has sufficiently high stability for practical use. It is also sometimes desirable that the tungsten salt compounds be previously suspended in an inert solvent such as benzene, toluene or chlorobenzene and solubilized by the addition of a small amount of an alcoholic compound or a phenolic compound.

The activator components of the metathesis polymerization catalyst system include organometallic compounds chiefly comprising alkylated compounds of metals of group I—group III in the periodic table, preferably, tetraalkyltins, trialkyltin hydrides, alkylaluminum compounds and alkylaluminum halide compounds such as diethylaluminum chloride, ethylaluminum dichloride, trioctylaluminum, dioctylaluminum iodide, tetrabutyltin and tributyltin hydrides. The organometallic compound used as the activator component is dissolved in the monomer mixture to form the other reactive solution (Solution B) containing the activator.

According to the present invention the molded polymer articles are produced by mixing the Solution A with the Solution B. The polymerization reaction, however, starts very rapidly when the above-mentioned composition is used and, consequently, undesirable initiation of hardening can occur before the mold is completely filled with the mixed solution. In order to overcome the problem, it is preferable to use a polymerization moderating agent. As such moderators are generally used Lewis bases, particularly, ethers, esters, nitriles and the like. Examples of the moderators include ethyl benzoate, butyl ether, diglyme and the like. Such moderators are generally added to the solution containing the activator component comprising the organometallic compound. When a monomer having a polar group and acting as a Lewis base is used in the reactive solution, the monomer may be used to play the role of the moderator.

When a tungsten compound is used as the catalyst component, the ratio of the tungsten compound in the metathesis polymerization catalyst system to the above-mentioned monomers is about 1000:1 about 15000:1, and preferably about 2000:1 on the molar basis. When an alkylaluminum compound is used as the activator component: the ratio of the aluminum compound to the above-mentioned monomers is about 100:1 to about 2000:1 and preferably around a ratio of about 200:1 to about 500:1 on the molar basis. The amount of the moderator may be adjusted by experiments depending upon the amount of the catalyst system.

In order to decrease the residual monomer content, a small amount of an active halogen compound such as trichloromethyl toluene, ethyl trichloroacetate, isophthaloyl chloride and the like or an acid anhydride such as benzoic anhydride may be added in the production of the molded polymer article of the present invention.

A variety of additives may be used in the molded polymer article of the present invention to improve or to maintain characteristics of the molded articles. The additives include fillers, pigments, antioxidants, light stabilizers, flame retardants, macromolecular modifiers and the like. These additives have to be added to the starting solutions, since they cannot be added after the solutions are polymerized to the molded polymer article. Such additives may be added easily to either one or both of the Solution A and the Solution B. The additives should be ones being substantially unreactive with the highly reactive catalyst component, activator component and acid anhydrides in the solutions to avoid practical troubles and they have no inhibitory action to polymerization. If a reaction between the additive and the catalyst component or the activator component is unavoidable, but does not essentially inhibit the polymerization, the additives can be mixed with the monomers to prepare a third solution, and the third solution is mixed with the first and/or second solutions immediately before polymerization. When the additive is a solid filler forming gaps which can be filled sufficiently with both solutions immediately before or during the polymerization reaction, the mold may be filled with the filler prior to charging the reactive solutions into the mold.

The reinforcing materials or fillers used as additives can improve flexural modulus of the polymer. These include glass fibers, mica, carbon black, wollastonite and the like.

The molded polymer article used in the present invention preferably contain an antioxidant. Preferably, a phenolic- or amine-antioxidant is added to the solution in advance. Examples of the antioxidants include: 2,6-t-butyl-p-cresol, N,N-diphenyl-p-ph-enylenediamine, and tetrakis[methylene(3,5-di-t-butyl-4-hydroxycin-namate)]-methane.

The molded polymer articles of the present invention may also contain other polymers, which are added to the monomer solution. Among polymers, elastomers are most used, since the addition of elastomer is effective in improving the impact strength of the molded articles and controlling the viscosity of the solution. Examples of the elastomers to be used for the above purpose include, e.g., a wide variety of elastomers such as styrene-butadiene-styrene triblock rubber, styrene-isoprene-styrene triblock rubber, polybutadiene, polyisoprene, butyl rubber, ethylene-propylene-diene terpolymer and nitrile rubber.

As described above, the molded polymer articles to be used in the present invention are prepared by reaction molding.

The molding method of the article include, as mentioned above, a resin (also known as "resin transfer") process comprising the mixing of a catalyst and a monomer with a static mixer or the like in advance and the injection of the produced premix into a mold and a RIM process comprising the impingement mixing of the Solution A and the Solution B containing divided catalyst system in a mix head and the substantially immediate injection of the mixture into the mold. The RIM process is generally used.

In both of RIM process and resin injection process, the mixture can be introduced into the mold under relatively low pressure, so that an inexpensive mold is usable. The temperature in the mold increases rapidly by the heat of reaction upon the start of the polymerization reaction in the mold, so that the polymerization reaction is completed in a short time. The molded article of the invention can be removed easily from the mold without using a mold release agent.

A molded polymer article can be modified to reduce the combustibility and increase the flame retardance by the process of the present invention. Furthermore, the chemical stability or the resistance to electrophilic chemical attack at the double bond of the polymer can be improved by the selective halogenation of the surface of the article. In some cases, the characteristic odor of the molded article supposed to be caused by residual monomers can be decreased as a subsidiary effect.

The modification of the present invention can be extremely easily carried out because it is completely independent of the molding process of the polymer and of the processes before the molding.

The modified product produced by the present invention can be subjected to various post-treatment processes such as coating and adhesion similar to the conventional molded polymer article.

The molded article treated by the above processes can be used in a variety of uses, particularly those uses required to have a certain extent of flame retardance, for example, parts of various transportation vehicles on ground, water or snow including automobiles, motorbikes, golf carts, snow mobiles, boats, hydroscooters, sand buggies, tractors.

Figure 1:
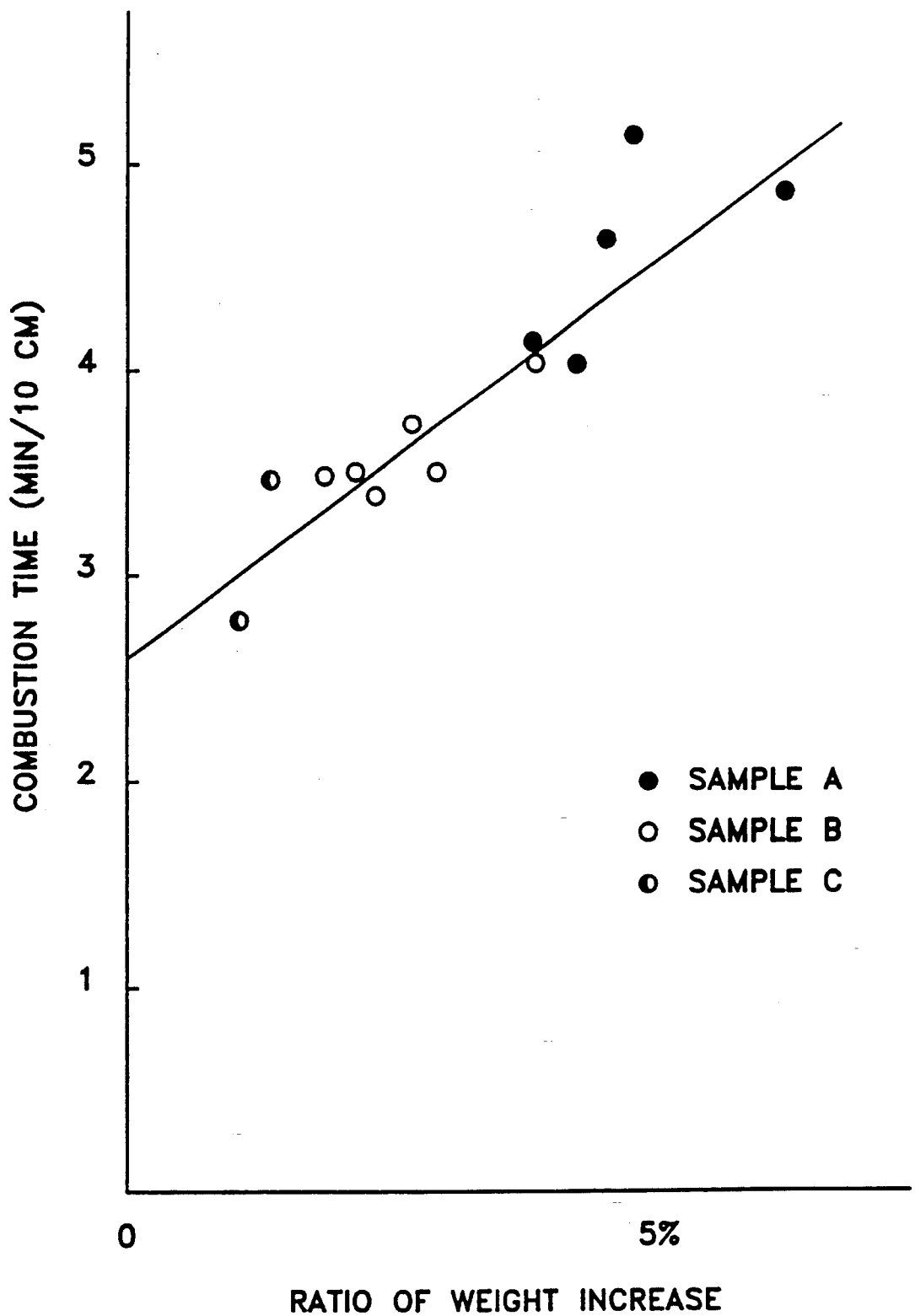
FIGS. 1, 2 and 3 are test results from treated samples.

The invention described is illustrated by the following Examples and Comparative Example. These examples are solely for explanation and do not limit the scope of the invention.

EXAMPLE 1-6

Preparation of molded plate for halogenation treatment:

Tungsten hexachloride (20 parts by weight) was added to 70 parts by volume of anhydrous toluene under nitrogen. The obtained mixture was mixed with a solution consisting of 21 parts by weight of nonylphenol and 16 parts by volume of toluene to obtain a catalyst solution containing 0.5 M of tungsten. The solution was purged with nitrogen over night to remove the hydrogen chloride gas formed by the reaction of tungsten hexachloride and nonylphenol. A catalyst solution for polymerization was prepared by adding 1 part by volume of acetylacetone to 10 parts by volume of the solution produced by the above procedure.

To a monomer mixture consisting of 95 parts by weight of purified dicyclopentadiene and 5 parts by weight of purified ethylidenenorbornene was added 3 parts by weight of an ethylene-propylene-ethylidenenorbornene copolymer rubber having an ethylene content of 70 mol% and with 2 parts by weight of Ethanox 702 as an oxidation stabilizer. The obtained solution was mixed with the above catalyst solution for polymerization in an amount to give a tungsten content of 0.001 M and obtain a catalyst component solution (Solution A).

A mixed solution of polymerization activator was prepared by mixing trioctylaluminum, dioctylaluminum iodide and diglyme at molar ratios of 85:15:100. The mixed solution was added to a mixture consisting of 95 parts by weight of purified dicyclopentadiene, 5 parts by weight of purified ethylidenenorbornene and 3 parts by weight of the above-mentioned ethylene-propylene-ethylidenenorbornene copolymer rubber in an amount to give an aluminum content of 0 003 M to obtain an activator component solution (Solution B).

A molded plate of a metathesis polymer having a thickness of 3 mm was produced from the Solution A and the Solution B prepared above using a reaction injection molding machine. The liquid temperature and the mold temperature in the injection were 30° C. and 80° C., respectively.

The molded plate prepared above was cut to form sample plates having a dimension of 12.5 cm × 1.25 cm × 3 mm. The sample plates were immersed in various kinds of solvents shown in Table 1 containing dissolved bromine at room temperature for a prescribed period. The treated plates were dried at 40° C. in vacuum for 2 days and the ratios of weight increase were measured The results are given in Table 1. Table 1 also contains the swelling ratio of the molded plate in various solvents and it can be seen from the table that the bromination in a solvent having high swelling ability generally gives higher ratio of weight increase The weight increase is primarily caused by bromination, however, a part of the weight increase may be based on the residual solvent.

A rectangular piece of the treated sample was clamped at an end with a clamp and held in horizontal state. The other end of the sample was ignited with a gas burner for 30 seconds and the period to burn 10 cm of the sample after the start of ignition or, if the flame was extinguished prior to 10 cm burn, the period from the ignition to the extinguishment and the length burnt before extinguishment are also recorded in the table. A similar combustion test was carried out on an untreated molded plate for comparison and the period to burn 10 cm of the plate was measured. As is obvious from these results, the burning period is prolonged to a significant extent even at a weight increase of about 0.2% and is nearly doubled at a weight increase of about 10%. When the weight increase is 15% or more, the sample becomes self-extinguishing. As mentioned before, it is supposed that a considerable amount of the solvent used in the swelling treatment may be left in the sample in the case of a solvent having high swelling power and, accordingly, the above improvement in the flame retardance was attained at a bromine content smaller than the above ratio of weight increase The surface of the treated plate was discolored from pale brown to black according to the increase in the weight without losing the flexibility of the plate. Some plates exhibited slight warpage at high ratio of weight increase.

similar to that of the former examples after the determination of the weight increase.

Figure 2:
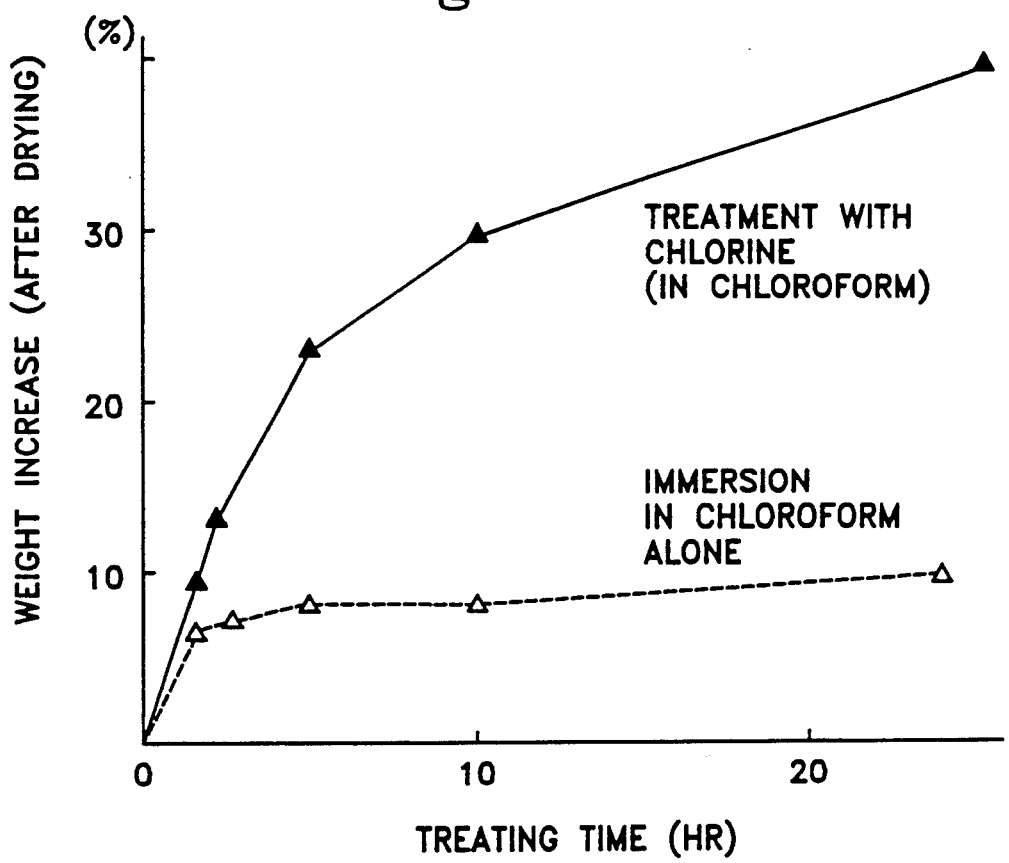
Figure 3:
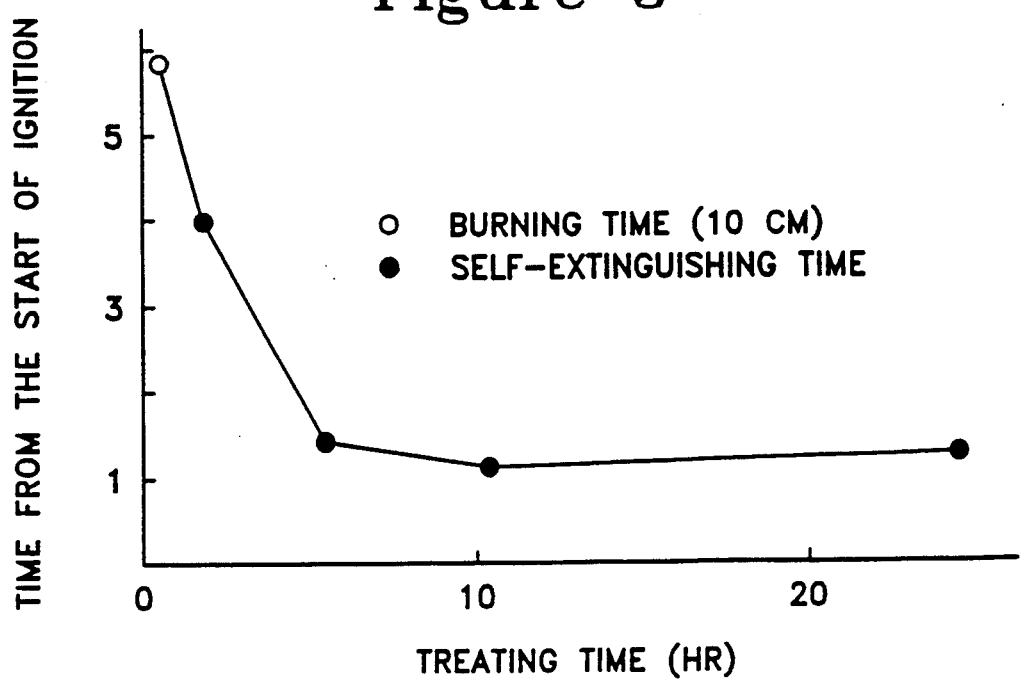

In order to determine the content of residual chloroform, samples were immersed in chloroform free from chlorine for the same periods, dried by the same method as above and weighed to obtain the weight increase of the sample. These results are shown in the FIGS. 2 and 3. As is obvious from the figures, the residual chloroform content is nearly constant at about 6 to 8%. When the essential weight increase by chlorine exceeds 10% (the total weight increase is 15%), the sample becomes self-extinguishing. For samples having weight increase of 15% or more, the flame spontaneously extinguishes within little over 1 minute. The self-extinguishing time is maintained almost at the level even by further increas-

TABLE 1

| | | Results of Bromine Treatment | | | | Results of Treatment | | |
|---|---|---|---|---|---|---|---|---|
| | | Conditions of Treatment | | | | Combustion Test | | |
| | | | | | | | Self-extinguishing | |
| Example No. | Treating Medium | Swelling Power of Medium in Immersion of Molded Plate (%) | Concentration of Bromine (wt %) | Immersion Time (hr) | Weight Increase (wt. %) | Burning Time (min/10 cm) | Extinguishing Time (min) | Extinguished Position (cm from an end) |
| 1 | Water | ~0 | Saturation* (pH 1) | 24 | 0.18 | 3.17 | — | — |
| 2 | Ethanol | ~1 | 4.5 | 24 | 0.16 | 2.95 | — | — |
| 3 | p-Xylene | ~50 | 4.25** | 7 | 17.5 | — | 4.57 | 7.3 |
| | | | | 24 | 23.4 | — | 1.68 | 2.5 |
| 4 | Chloroform | ~160 | 2.45 | 7 | 31.1 | — | 1.12 | 1.5 |
| | | | | 24 | 38.0 | — | 1.12 | 1.1 |
| 5 | Ethyl Acetate | ~4 | 3.9 | 24 | 10.0 | 6.72 | — | — |
| 6 | Pyridine | 22 | 4.7 | 24 | 10.4 | 5.48 | — | — |
| Comparative Example | | | Untreated | | 0 | 2.6—2.7 | — | — |

*Immersed in water acidified to pH 1 with sulfuric acid and saturated with bromine in a state leaving a part of excess liquid bromine.
**Characteristic bromine color was disappeared during the treatment and the generation of hydrogen bromide was noticed. It is supposed that bromine was reacted also with p-xylene used as the solvent to generate hydrogen bromide.

EXAMPLE 7

A solvent having high swelling power had high flameretarding effect, however, slight deformation of plate occurred in some samples as can be seen in the above Example 4. Accordingly, the bromination under controlled swelling was attempted by separating the swelling with a solvent from the contact with bromine.

Samples of the molded plates same as those of the Example 1 were immersed in dichloroethane at normal temperature for 24 hours (samples A), for 5 hours (samples B) or untreated (samples C). Each sample was placed in bromine gas stream to effect the bromination, taken out of the stream after a predetermined period, dried in vacuum at 600° C. for 2 days and weighed to determine the weight increase. All of these samples had small strain and good surface properties. The samples were subjected to the combustion test similar to the above examples and the relationship between the burning time of 10 cm sample and the weight increase was plotted on each of the samples A, B and C to obtain the FIG. 1 The burning time is extended according to the increase in the weight and is doubled at a weight increase of about 5%.

EXAMPLE 8

Samples were treated for various time periods up to 24 hours by a method similar to Example 4 provided that the treatment of the sample plate was carried out by blowing chlorine gas into chloroform. The treated samples were dried in vacuum at 60° C. for 2 days. The dried samples were subjected to the combustion test ing the weight increase with chlorine. It is evident that the molded polymer article can be made flame-retardant by the chlorine post-treatment.

We claim:

1. A method for halogenating a molded polymer article prepared by the reaction molding of a polycyclic cycloolefin monomer comprising 50 to 100 ml percent dicyclopentadiene under the influence of a metathesis catalyst that comprises immersing the polymer article in an organic solvent for a time sufficient to effect swelling of the article, the organic solvent containing dissolved molecular halogen for at least part of the time the polymer article is immersed in the solvent.

2. The method of claim 1 wherein the halogen is dissolved in the solvent for the entire time the polymer article is immersed in the solvent.

3. The method of claim 1 wherein the halogen is dissolved in the solvent after the polymer article has been swollen by the solvent.

4. The method of claim 3, wherein the molecular halogen is chlorine or bromine.

5. The method of claim 3 wherein the organic solvent is a halogenated hydrocarbon.

6. The method of claim 1 wherein the molecular halogen is chlorine or bromine.

7. The method of claim 1 wherein the organic solvent is a halogenated hydrocarbon.

8. The method of claim 2 wherein the organic solvent is an alcohol.

9. The method of claim 8 wherein the organic solvent is ethyl alcohol and the molecular halogen is bromine or chlorine.

* * * * *

UNITED STATES PATENT AND TRADEMARK OFFICE
CERTIFICATE OF CORRECTION

PATENT NO. : 5,061,521

DATED : October 29, 1991

INVENTOR(S) : Zen-ichiro Endo, Shigeyoshi Hara and Umewaka Nakatani (Case 2)

It is certified that error appears in the above-identified patent and that said Letters Patent is hereby corrected as shown below:

Col. 5, line 13, "-5methylnorbornene" should read "-5-methylnorbornene";

Col. 6, line 68, "N,N-diphenyl-p-ph-enylenediamine," should read "N,N-diphenyl-p-phenylenediamine,";

Col. 8, line 35, "0 003 M" should read "0.003 M"; and

In the Claims, Col. 10, line 43, "50 to 100 ml" should read "50 to 100 mol".

Signed and Sealed this

Sixth Day of April, 1993

Attest:

STEPHEN G. KUNIN

Attesting Officer

Acting Commissioner of Patents and Trademarks